United States Patent [19]

Bill et al.

[11] Patent Number: 4,532,287
[45] Date of Patent: Jul. 30, 1985

[54] FLAMEPROOFING COMPOSITION FOR POLYPROPYLENE COMPRISING A HALOGENATED ALKYLARYL ETHER, AN ORGANO-TIN COMPOUND AND A STERICALLY HINDERED PHENOL OR BISPHENOL

[75] Inventors: Rudolf Bill; Rainer Wolf, both of Allschwil, Switzerland

[73] Assignee: Sandoz Ltd., Basel, Switzerland

[21] Appl. No.: 609,483

[22] Filed: May 11, 1984

[30] Foreign Application Priority Data

May 13, 1983 [DE] Fed. Rep. of Germany ....... 3317393

[51] Int. Cl.$^3$ ............................................. C08L 55/02
[52] U.S. Cl. ................................... 524/343; 252/609; 524/350; 524/371; 524/373; 524/374; 524/375; 524/399
[58] Field of Search ............... 524/343, 350, 371, 373, 524/374, 375, 399; 252/609

[56] References Cited

U.S. PATENT DOCUMENTS

| | | | |
|---|---|---|---|
| 3,764,579 | 10/1973 | Dix et al. | 260/45.75 |
| 3,842,033 | 10/1974 | Brady et al. | 524/343 |
| 3,849,352 | 11/1974 | Reed et al. | 524/343 |
| 4,147,636 | 4/1979 | Drake et al. | 252/8.1 |
| 4,221,700 | 9/1980 | Minagawa et al. | 524/128 |

*Primary Examiner*—Maurice J. Welsh
*Attorney, Agent, or Firm*—Gerald D. Sharkin; Richard E. Vila; Thomas C. Doyle

[57] ABSTRACT

Compositions for flameproofing polymeric material comprising:
(a) a halogenated alkylaryl ether, the aryl group of which may be substituted by halogen;
(b) an organo-tin compound; and
(c) a sterically hindered phenol or a bisphenol containing a sterically hindered —OH group on each phenyl.

In this specification by the term "bisphenol" is meant a compound containing two phenol groups linked by a bridging group that is not attached to any other bisphenol groups and by the term "phenol" is meant compounds containing only a single phenol group.

20 Claims, No Drawings

FLAMEPROOFING COMPOSITION FOR POLYPROPYLENE COMPRISING A HALOGENATED ALKYLARYL ETHER, AN ORGANO-TIN COMPOUND AND A STERICALLY HINDERED PHENOL OR BISPHENOL

The invention relates to compositions for flameproofing polymeric material comprising:
(a) a halogenated alkylaryl ether, the aryl group of which may be substituted by halogen;
(b) an organo-tin compound; and
(c) a sterically hindered phenol or a bisphenol containing a sterically hindered —OH group on each phenyl.

In this specification by the term "bisphenol" is meant a compound containing two phenol groups linked by a bridging group that is not attached to any other bisphenol groups and by the term "phenol" is meant compounds containing only a single phenol group.

Preferred halogenated alkylaryl ethers (a) are of formula I $$R_1-\text{C}_6\text{H}_{4-m_1}(R_2)_{m_1}-\text{OCH}_2\text{CHBr-CH}_2\text{Br} \quad (I)$$

in which
$R_1$ is halogen or a group of formula d $$\text{BrCH}_2-\text{CHBr}-\text{CH}_2-\text{O}-\text{C}_6\text{H}_{4-m_2}(R_2)_{m_2}-A- \quad (d)$$

$m_1$ and $m_2$ independently of one another are 0, 1 or 2;
each $R_2$ independently is chlorine or bromine;
A is a direct bond, $C_{1-4}$alkylene;

$$-\text{C}_6\text{H}_5\text{CH}-$$

—O—, —S— or —SO$_2$—.

Preferred organotin compounds (b) are di($C_{1-12}$alkyl)tin carboxylates and di($C_{1-12}$alkyl)tin mercaptides. More preferred are dibutyltin maleate, dioctyltin laurate or dibutyltin mercaptide.

Preferred compounds of component (c) are of formula II, III or IV $$\text{(II)} \quad R\text{-C}_6\text{H}_3(R_4)(R_3)\text{-OH}$$

$$\text{(III)} \quad \text{3,3'-}(CH_3)_3C\text{, 5,5'-}R\text{-bis(2-hydroxyphenyl)}Z_1$$

$$\text{(IV)} \quad \text{analogous with }Z_2, R, (CH_3)_3C$$

in which
R is hydrogen or $C_{1-12}$alkyl;
$Z_1$ is $C_{1-4}$alkylene;
$Z_2$ is $C_{1-4}$alkylene;
$R_3$ is $C_{1-12}$alkyl; and
$R_4$ is $C_{4-12}$alkyl.

Preferably R is R' where R' is hydrogen or methyl, more preferably methyl.

Preferably $R_3$ is $R_3'$ where $R_3'$ is —CH$_3$ or —C(CH$_3$)$_3$.

Preferably $R_4$ is $R_4'$ where $R_4'$ is —C$_9$H$_{19}$ or —C(CH$_3$)$_3$.

Preferably $Z_1$ is $Z_1'$ where $Z_1'$ is —CH$_2$— or $$-\text{CH}(CH_3)-$$

more preferably —CH$_2$—.

Preferably $Z_2$ is $Z_2'$ where $Z_2'$ is —(CH$_2$)$_{1-4}$ or $$-\text{CH}(CH_2CH_2CH_3)-,$$

more preferably $$-\text{CH}(CH_2CH_2CH_3)-.$$

Preferably $R_1$ is a group of formula (d).
Preferably $m_1$ and $m_2$ are 2.
Preferably $R_2$ is bromine.
Preferably A is A' where A' is $C_{1-4}$alkylene, a direct bond or —O—. More preferably A is A" where A" is $C_{1-4}$alkylene or a direct bond.

When A is $C_{1-4}$alkylene preferably this is —CH$_2$CH$_2$— or $$CH_3-\text{C}(CH_3)-CH_3,$$

more preferably the latter.
Preferred compounds of formula I are of formula Ia

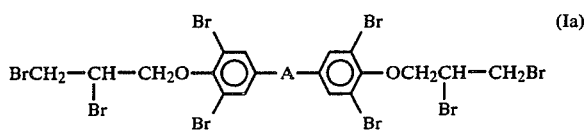

Preferred compounds of formula II are of the formula IIa or IIb

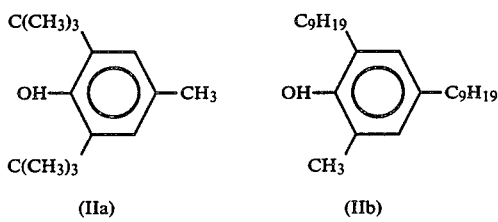

Preferred compounds of component (c) are of formula II.

The most preferred compound of component (c) is of formula II where $R_3$ and $R_4$ are tert.-butyl and R is methyl.

Compounds of formula I, II, III and IV are known or can be prepared from known compounds by known methods.

Flameproofing compositions according to the invention are useful for flameproofing polymeric material in which the use of a composition according to the invention imparts better flameproofing properties than the individual components.

The concentration of a composition according to the invention employed in the polymeric material is suitably 0.5 to 9% by weight, preferably 1 to 4% by weight. The composition according to the invention may be added before, during or after the polymerization step and may be added in solid form, in solution preferably as a liquid concentrate containing from 20 to 80% by weight of the composition and 80 to 20% by weight of solvent or as a solid masterbatch composition containing 20 to 80% (more preferably 40 to 70%) by weight of the composition and 80 to 20% (more preferably 60 to 30%) by weight of a solid polymeric material which is identical with or compatible with the material to be stabilized.

Suitable polymeric materials include plastic materials for example polyethylene, polypropylene, polystyrene and ABS.

The compositions according to the invention may be incorporated by known methods into the polymeric material to be stabilized. Of particular importance is blending of the compounds with thermoplastic polymers in the melt, for example in a melt blender or during the formation of shaped articles, including foils, tubes, fibres and foams by extrusion, injection moulding, blow moulding, spinning or wire coating. The compositions according to the invention are particularly useful for polypropylene fibres or foils.

It is not essential for the polymeric material to be fully polymerised before mixing with the composition according to the invention. The compounds may be mixed with monomer, prepolymer or precondensate, and the polymerisation or condensation reaction carried out subsequently. This will of course be the preferred method of incorporation of the compounds into thermosetting polymers, which cannot be melt blended.

The composition according to the invention may be used alone or in combination with other stabilizers, for example light stabilizers and antioxidants. Examples include sterically hindered phenols, sulphur or phosphorus-containing compounds or mixtures of these. Examples are benzofuran-2-ones; indolin-2-ones and sterically hindered phenols such as β-(4-hydroxy-3,5-ditert.-butylphenyl)propionyl stearate, methane tetrakis-[methylene-3(3′,5′-ditert.-butyl-4-hydroxyphenyl-)-propionate], 1,3,3-tris-(2-methyl-4-hydroxy-5-tert.-butylphenyl)-butane, 1,3,5-tris(4-tert.-butyl-3-hydroxy-2,6-dimethylbenzyl)-1,3,5-triazin-2,4,6(1H, 3H, 5H-trione, bis-(4-tert.-butyl-3-hydroxy-2,6-dimethylbenzly)-dithiolterephthalate, tris-(3,5-ditert.-butyl-4-hydroxybenzyl)isocyanurate, the triester of β-(4-hydroxy-3,5-ditert.-butylphenyl)propionic acid with 1,3,4-tris-(2-hydroxyethyl)-5-triazin-2,4,6(1H, 3H, 5H)trione, bis-[3,3-bis-(4′-hydroxy-3-tert.-butylphenyl)-butyric acid]glycol ester, 2,2′-methylene-bis-(4-methyl-6-tert.-butyl)-phenol.

Sulphur-containing antioxidative co-stabilizers which may be used include for example distearylthiodipropionate, dilaurylthiodipropionate, methane tetrakis-(methylene-3-hexylthiopropionate), methane-tetrakis-(methylene-3-dodecylthiopropionate) and dioctadecyldisulphide. Phosphorus-containing co-stabilizers include for example trinonylphenyl-phosphite, 4,9-distearyl-3,5,8,10-tetraoxadiphosphaspiroundecane, tris-(2,4-ditert.-butylphenyl)-phosphite and tetrakis(2,3-ditert.-butylphenyl)-4,4′-biphenylene diphosphonite. Further additives such as aminoaryl compounds, U.V.-absorbers and light stabilizers e.g. 2-(2′-hydroxyphenyl)-benzotriazole, 2-hydroxybenzophenone, 1,3-bis-(2′-hydroxybenzoyl)-benzene, salicylates, cinnamates, benzoates and substituted benzoates, sterically hindered amines and oxalic acid diamides may be used. Other known types of additives, e.g. flame retardants and antistatic agents, may also be added.

The addition of a composition according to the invention has the advantage that no or only a little reduction of the filtering time of the mass of material passing through a filter of an apparatus for preparing polypropylene fibres, produced from a spin mass occurs. Further, there is no development of smoke on the spinnerets and only a moderate increase in the melt index of the polymer melt. It is surprising to find that a composition according to the invention produces a high flameproofing effect without significantly worsening other properties such as the filtering time for passing material through the filter of a spin mass apparatus, the melt index and development of smoke.

The ratio of the compound of component (a) to those of component (c) is preferably 50:1 to 5:1, more preferably 20:1 to 6:1, most preferably 12:1 to 8:1. The ratio of the compounds of component (b) to the sum of components (a) and (c) is preferably 1:50 to 1:5, more preferably 1:25 to 1:6, most preferably 1:14 to 1:8.

The invention will now be illustrated by the following Examples in which all parts and percentages are by weight and all temperatures are in °C. unless indicated to the contrary.

EXAMPLE 1

48.15 Parts of the compound of formula (1a)

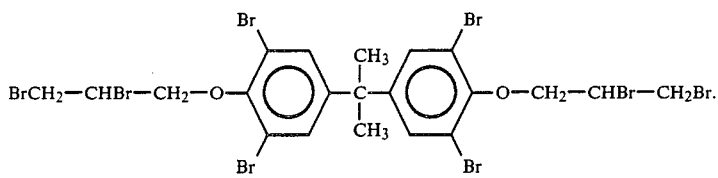

8.5 Parts of the compound of formula (1b)

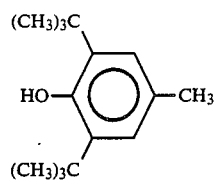

and 4.85 parts of dibutyltin maleate are mixed with 38.5 parts of a commercial polyethylene (having a melt flow index (MFI) 190°/2.16 kp:17 to 22). This mixture is homogenised in a continuous kneader or extruder and is then formed into a master batch in granulate form.

EXAMPLE 2

95 Parts of a commercial polypropylene (MFI 230°/2.16 kp:4) is mixed with 5 parts of the masterbatch of Example 1 in a rolling flask and is homogenised using a rolling mill (Schwabenthan) for 5 minutes at a temperature of 165° to 175°. From resulting rolled mass, plates 1 mm thick are prepared at 230° over 3 minutes using a press (Bucher-Guyer). These plates are subjected to following tests (1)+(2).

1. Determination of the Limiting Oxygen Index (according to the American Standard Test Method ASTM-D2863).
2. Vertical flameproofing Test (according to Deutsche Industrie Norm (DIN) 53438.

Further tests may be carried out on the mass produced in Example 2.

3. MFI Test: The material is extruded from an extruder (Händle) at 230° and then is granulated. Using the granulate the MFI value at 230°/2.16 kp is measured. This procedure is repeated a further four times (using the granulate each time) and further MFI values are measured.
4. Extrusiometer Test: The material is introduced into an Extrusiometer (Göttfert) and is extruded at a rate of 1.2 kg per hour at a temperature of 185° to 240°. The extruded material is passed through a series of sieves (having mesh sizes 900/16000/900 mesh/cm²) and the time is measured until a pressure of 85 Bar is reached. In all these tests the product showed good results.

What is claimed is:

1. A flameproofing composition comprising:
(a) a compound of formula (Ia)

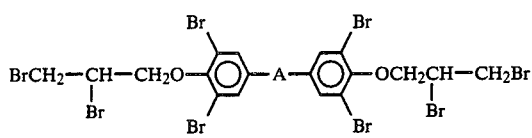

wherein A is a direct bond, $C_{1-4}$alkylene,

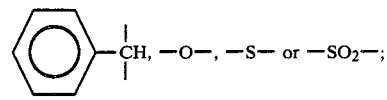

(b) an organo-tin compound; and
(c) a sterically hindered phenol or a bisphenol containing a sterically hindered —OH group on each phenyl.

2. A composition according to claim 1 in which component (b) is selected from di($C_{1-12}$alkyl)tin carboxylates and di($C_{1-12}$alkyl)tin mercaptides.

3. A composition according to claim 2 in which component (b) is selected from dibutyltin maleate, dioctyltin laurate and dibutyltin mercaptide.

4. A composition according to claim 2 in which component (c) is a compound of formula II, III or IV,

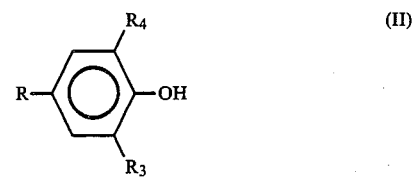

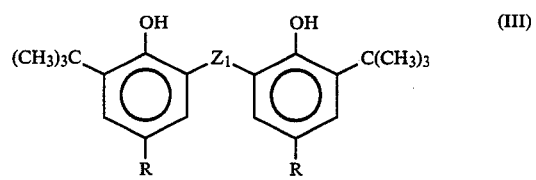

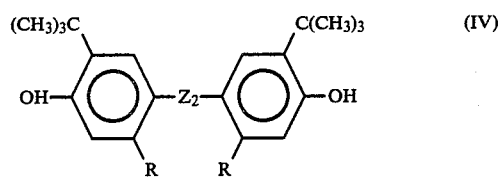

in which
R is hydrogen or $C_{1-12}$alkyl;
$Z_1$ is $C_{1-4}$alkylene;
$Z_2$ is $C_{1-4}$alkylene;
$R_3$ is $C_{1-12}$alkyl; and
$R_4$ is $C_{4-12}$alkyl.

5. A composition according to claim 4 in which the ratio of component (a) to (c) is 50:1 to 5:1 and the ratio of component (b) to the sum of components (a) and (c) is 1:50 to 1:5.

6. Flameproofed polymeric material selected from the group consisting of polyethylene, polypropylene, polystyrene and ABS and containing 0.5 to 9%, by weight, of a composition according to claim 5.

7. A composition according to claim 4 in which component (b) is selected from dibutyltin maleate, dioctyltin laurate and dibutyltin mercaptide.

8. Flameproofed polymeric material selected from the group consisting of polyethylene, polypropylene, polystyrene and ABS and containing 0.5 to 9%, by weight, of a composition according to claim 4.

9. A composition according to claim 2 in which component (c) is a compound of formula IIa or IIb

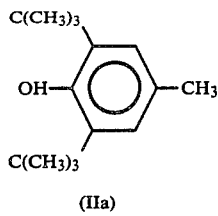  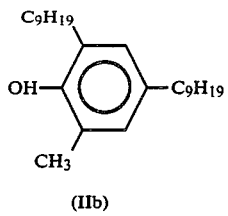

(IIa)          (IIb)

10. A composition according to claim 1 in which component (c) is a compound of formula II, III or IV,

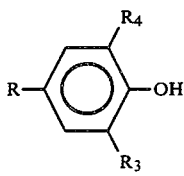
(II)

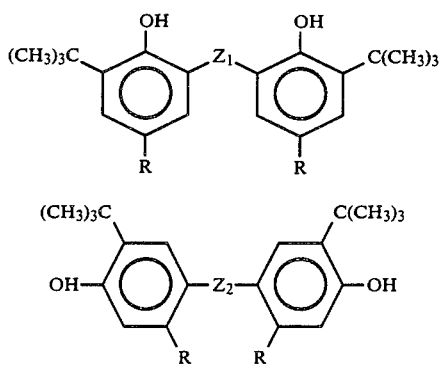

in which

R is hydrogen or $C_{1-12}$alkyl;
$Z_1$ is $C_{1-4}$alkylene;
$Z_2$ is $C_{1-4}$alkylene;
$R_3$ is $C_{1-12}$alkyl; and
$R_4$ is $C_{4-12}$alkyl.

11. A composition according to claim 10 in which component (c) is a compound of formula IIa or IIb

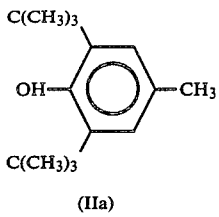  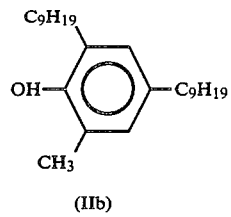

(IIa)          (IIb)

12. A composition according to claim 10 in which component (c) is a compound of formula II defined in claim 6 where $R_3$ and $R_4$ are tert.-butyl and R is methyl.

13. A composition according to claim 1 in which the ratio of component (a) to (c) is 50:1 to 5:1 and the ratio of component (b) to the sum of components (a) and (c) is 1:50 to 1:5.

14. Flameproofed polymeric material selected from the group consisting of polyethylene, polypropylene, polystyrene and ABS and containing 0.5 to 9%, by weight, of a composition according to claim 13.

15. A composition according to claim 1 containing additionally a light stabilisor and/or an antioxidant.

16. A concentrated liquid solution containing 20 to 80% by weight of a composition according to claim 1 and 80 to 20% by weight of a solvent.

17. A solid masterbatch composition containing 20 to 80% by weight of a composition according to claim 1 and 80 to 20% by weight of a solid polymeric material.

18. A process for flameproofing a polymeric material comprising applying to the polymeric material a composition according to claim 1.

19. A polymeric substrate containing a composition according to claim 1.

20. Fibres or foils of polypropylene containing a composition according to claim 1.

* * * * *